Patented Feb. 12, 1929.

1,701,946

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR COMPOUNDING AND VULCANIZING RUBBER AND PRODUCTS OBTAINED THEREFROM.

No Drawing. Application filed December 17, 1923, Serial No. 681,066. Renewed July 12, 1928.

This invention relates to compounding and vulcanizing rubber. It is more particularly directed to compounding by absorption and diffusion throughout the rubber of vulcanizing ingredients and the vulcanization of the rubber, and products obtained therefrom.

This application is a continuation in part of application Serial No. 574,780, filed July 13, 1922. Reference is also made to the application of Omar H. Smith, Serial No. 41,875, filed July 6th, 1925.

One of the objects of the present invention is to provide a simple process for introducing one or two vulcanizing ingredients which form part of an active vulcanizing combination, into sheet rubber or otherwise previously shaped rubber while avoiding prevulcanization thereof. Another object of the invention is to provide a series of useful products from such process having desirable physical characteristics.

It has been found in accordance with the present invention that vulcanization at ordinary temperatures, approximately 70° F. may be carried out when the four ingredients, M in combination, where M represents zinc or other metal defined hereinafter, an amine, a material comprising sulphur and a material comprising carbon disulphide are present. At temperatures above the ordinary temperature, say 212° F. or 240–286° F. (the temperature of normal hot vulcanization), or above, vulcanization occurs at an increased rate.

The invention accordingly comprises a process for introducing materials into rubber which includes combining two of the four vulcanizing ingredients, namely an amine, a material containing carbon disulphide, a metal M in combination, and sulphur, with rubber, and substantially without changing the form of the combination introducing the remaining vulcanizing ingredients from a medium other than rubber. It also includes combining three of the four vulcanizing ingredients mentioned above with rubber and substantially without changing the shape of the combination introducing the remaining vulcanizing ingredient from solution. It also includes products resulting from such processes.

In carrying out the invention in its preferred form, the following procedure is employed: 100 parts of pale crepe rubber, 10 parts of zinc oxide, and 3 parts of sulphur, are combined by milling in the ordinary manner. The material is calendered to form a thin sheet, say .010 inch thick and this sheet is painted with carbon disulphide and dibenzylamine solutions, the carbon disulphide being employed in the form of a 5% benzol solution, the dibenzylamine being employed in the form of a 3.2% benzol solution. The carbon disulphide and dibenzylamine may be applied separately or combined, each or both solutions being applied at three minute intervals four times. After standing over night the sheet is heated to 212° C. in open air for 1 hr. at the end of which time vulcanization is accomplished.

Other procedures falling within the invention are as follows: 10 parts of zinc oxide, 3.2 parts of dibenzylamine are combined with 100 parts of rubber by milling. A thin film of this material is subjected to 10% benzol solution of oxy normal butylthiocarbonic acid disulphide by painting four times at three minute intervals, and the material is vulcanized as given in the preferred embodiment above. Oxy normal butylthiocarbonic acid disulphide comprises carbon disulphide and sulphur which with zinc oxide and dibenzylamine make up the four ingredients for vulcanization. Instead of oxy normal butylthiocarbonic acid disulphide a mixture of carbon disulphide 20% and sulphur 5% in benzol may be painted upon the sheet and vulcanization carried out in the same manner as in the preferred example.

As another example 4 parts zinc butyl xanthogenate which provides carbon disulphide and zinc in combination as two of the four ingredients are milled with 100 parts rubber, and a thin sheet .010 inch in thickness is treated with a benzol solution containing dibenzylamine 3.2% and sulphur 1%, vulcanization being accomplished as in the other examples.

Or 10 parts of oxy normal butyl thiocarbonic acid disulphide, providing carbon disulphide and sulphur of the four ingredients is combined with 100 parts rubber by milling, and a thin sheet .010 inch thickness is subjected to a benzol solution of zinc stearate 3% and dibenzylamine 3.2%.

As another example 3 parts of sulphur and 3.2 parts of dibenzylamine are combined with 100 parts of rubber by milling, and a thin sheet as heretofore is subjected to a benzol solution containing 4% of zinc butyl xanthogenate, which furnishes zinc in combination and carbon disulphide of the four ingredients. Vulcanization is accomplished as in the other examples. Instead of treating crude rubber, latex may be employed. The uncoagulated latex is mixed with an amount of zinc oxide corresponding to 10 parts on 100 parts of dried rubber and with an amount of sulphur corresponding to 3 parts on 100 parts of dried rubber. The latex is dried in a sheet, for instance, and the dried latex-rubber sulphur mixture is painted with dibenzylamine which is absorbed and permeates throughout the rubber mass. Subsequently it is painted with carbon disulphide which in turn is absorbed, permeates throughout the rubber mass and reacts with the chemicals already present, and causes vulcanization which will occur in the course of a week at ordinary temperatures, or upon heating for two hours at 212° F.

The products resulting from the above processes have desirable physical characteristics including high tensile strength and good resistance to ageing.

Instead of combining two ingredients with rubber and then introducing two others from a medium other than rubber as indicated above, three ingredients may be combined with the rubber and other vulcanizing ingredients may be introduced by absorption from a solution.

The following processes represent embodiments of this phase of the invention:

100 parts of rubber are combined with 4 parts of zinc butyl xanthogenate (including carbon disulphide and zinc in combination) and 2 parts dibenzylamine. A thin film .010 inch in thickness for example is treated with a 10% solution of sulphur in carbon disulphide until approximately 1 part of sulphur is absorbed by the rubber.

As another example 2 parts of dibenzylamine and 5 parts of oxy normal butyl thiocarbonic acid disulphide (including carbon disulphide and sulphur) are combined with 100 parts of rubber by milling and a thin film .010 inch in thickness for example is treated with 10% solution of zinc stearate in benzol until approximately 3 parts of zinc stearate are absorbed.

As another example 3 parts of sulphur and 4 parts of zinc butylxanthogenate are combined with 100 parts of rubber by milling and a thin film is treated with a 3% solution of dibenzylamine in benzol until 3 parts of dibenzylamine are absorbed.

As an alternative instead of treating the above composition with dibenzylamine in solution, it may be treated with an aqueous aniline solution until approximately 1 part of aniline is absorbed. The rubber treated by any of the preceding procedures is vulcanized by heating for 1 hr. at 212° F. or if allowed to stand at approximately 80° F. will vulcanize in the course of two weeks, or if heated at the normal hot vulcanization temperature, 240–286° F., for 20 minutes, vulcanization is accomplished. Other temperatures as desired may be employed.

It will be observed that the carbon disulphide is employed as such or a derivative thereof. It will be obvious that various other derivatives thereof or of carbon oxysulphide than those set forth may be used, such as those included in Cadwell's Patents Nos. 1,440,962, Jan. 2, 1923, 1,440,963, Jan. 2, 1923, 1,440,964, Jan. 2, 1923 and copending applications Sr. Nos. 548,828, 548,829, 548,831, filed April 1, 1922, which have become Patents Nos. 1,532,226, 1,532,227 and 1,510,652, respectively. Sulphur may be employed as such or in a compound adapted to transfer sulphur from itself to rubber under vulcanizing conditions as set forth in copending applications Sr. No. 359,807, filed Feb. 19, 1920 and Sr. No. 528,278, filed Jan. 10, 1922, now Patent No. 1,532,225. Various amines may be used and in general the observations set forth in connection with amines as mentioned in the patents and applications above are applicable in connection with the present processes. Instead of using zinc various metals set forth in the patents mentioned may be employed under the conditions therein stated. Briefly stated these metals which I have designated as M are as follows:—zinc, mercury, preferably in the mercuric state, lead, preferably in the plumbous state, cadmium, copper, preferably in the cupric state, arsenic, preferably in the arsenous state, manganese, preferably in the manganous state.

The processes of the present invention are simple economical ones. By eliminating the introduction of all of the ingredients by milling, danger of prevulcanization is avoided.

Materials which are ordinarily classed under the term rubber including balata, gutta percha, synthetic rubber, may be similarly employed in carrying out the invention, and it is intended to include such substances by the term rubber as herein employed.

The expression "carbon disulphide containing material" as used herein is intended to include the substance carbon disulphide itself.

As many apparently widely different embodiments of this invention may be made without departing from the spirit thereof, it will be understood that I do not intend to limit myself to the specific embodiments herein set forth except as indicated in the appended claims.

Having thus described my invention, what I claim and desire to protect by Letters Patent is:

1. A process for introducing materials into rubber which comprises introducing more than one of the four vulcanizing ingredients, viz:—dibenzylamine, a material containing carbon disulphide, zinc in combination, and sulphur, into rubber, and substantially without changing the form of the combination introducing the remainder of the vulcanizing ingredients from solution, the dibenzylamine and carbon disulphide being always separately introduced.

2. The method of producing vulcanized rubber, which comprises completing at least the heavy milling and mixing of the rubber compound, and thereafter first diffusing into the rubber compound one component of an accelerator, and then diffusing into the rubber compound the other component of said accelerator.

3. The method of producing a vulcanized rubber article, which comprises completing the heavy milling and mixing of the rubber compound and at least partially forming the article, and thereafter first diffusing into the at least partially formed article one component of an accelerator, and then diffusing into said article the other component of said accelerator.

4. The method of producing vulcanized rubber, which comprises completing at least the heavy milling and mixing of the rubber compound, and thereafter first diffusing into the rubber compound one component of an accelerator, and then diffusing into the rubber compound the other component of said accelerator, at least one of said components being applied in liquid form.

Signed at New York, New York, this 11th day of December, 1923.

SIDNEY M. CADWELL.